(12) United States Patent
Li et al.

(10) Patent No.: US 9,014,044 B2
(45) Date of Patent: Apr. 21, 2015

(54) COMMUNICATIONS TERMINAL AND METHOD AND APPARATUS FOR TESTING

(71) Applicant: Spreadtrum Communications (Shanghai) Co., Ltd., Shanghai (CN)

(72) Inventors: Cai Li, Shanghai (CN); Wei Han, Shanghai (CN); Yanshan Shi, Shanghai (CN)

(73) Assignee: Spreadtrum Communications (Shanghai) Co., Ltd., Shangai (CN)

( * ) Notice: Subject to any disclaimer, the term of this patent is extended or adjusted under 35 U.S.C. 154(b) by 0 days.

(21) Appl. No.: 14/004,422

(22) PCT Filed: Feb. 8, 2013

(86) PCT No.: PCT/CN2013/071572
§ 371 (c)(1),
(2) Date: Sep. 11, 2013

(87) PCT Pub. No.: WO2013/120447
PCT Pub. Date: Aug. 22, 2013

(65) Prior Publication Data
US 2014/0348009 A1    Nov. 27, 2014

(30) Foreign Application Priority Data
Jul. 24, 2012    (CN) .......................... 2012 1 0258330

(51) Int. Cl.
*H04W 24/10* (2009.01)
*H04W 72/08* (2009.01)
(52) U.S. Cl.
CPC ............ *H04W 24/10* (2013.01); *H04W 72/085* (2013.01)

(58) Field of Classification Search
CPC .......................... H04W 24/10; H04W 72/085
USPC ......................................................... 370/252
See application file for complete search history.

(56) References Cited

U.S. PATENT DOCUMENTS

2008/0189970 A1*  8/2008  Wang et al. ..................... 33/701
2010/0034126 A1*  2/2010  Kitazoe et al. ................ 370/310

FOREIGN PATENT DOCUMENTS

CN    101222726 A    7/2008
CN    101489304 A    7/2009
(Continued)

OTHER PUBLICATIONS

International Search Report and Written Opinion for PCT/CN2013/071572.
(Continued)

*Primary Examiner* — Jung Park
*Assistant Examiner* — Albert Shih
(74) *Attorney, Agent, or Firm* — Kilpatrick Townsend & Stockton LLP

(57) ABSTRACT

A method in a communication terminal for measuring one or more measurement quantities, wherein the measurement quantities correspond to a measurement identity, the method comprising: determining whether measurement of the measurement quantities can be performed in a first measurement occasion corresponding to the measurement identity; and if measurement of the measurement quantities cannot be performed in the first measurement occasion, measuring the measurement quantities using one or more other measurement occasions, wherein the one or more of the other measurement occasions correspond to at least one other measurement identity.

34 Claims, 6 Drawing Sheets

(56) References Cited

FOREIGN PATENT DOCUMENTS

| | | |
|---|---|---|
| CN | 101682852 A | 3/2010 |
| CN | 101895908 A | 11/2010 |
| CN | 101998437 A | 3/2011 |
| CN | 101998439 A | 3/2011 |
| CN | 102905287 A | 1/2013 |
| WO | 2008/085952 A1 | 7/2008 |
| WO | 2011160009 A2 | 12/2011 |

OTHER PUBLICATIONS

Search Report regarding the European counterpart application (13749962.0).

* cited by examiner

US 9,014,044 B2

COMMUNICATIONS TERMINAL AND METHOD AND APPARATUS FOR TESTING

RELATED APPLICATIONS

This application claims the priority and benefit under Article 8 of Patent Cooperation Treaty of Chinese Patent Application No. 201210258330.1, filed on Jul. 24, 2012, and Chinese Patent Application No. 201210032814.4, filed on Feb. 14, 2012, the contents of which are incorporated herein by reference in its entirety.

TECHNICAL FIELD

This disclosure relates to methods and apparatus for communication systems, and more particularly, to methods and apparatus for performing measurement in a communication terminal.

BACKGROUND

Mobile communication technologies are widely used today with mobile networks. A mobile network may include a number of cells, each corresponding to a geographical area. Within each cell, communication terminals such as mobile phones or, more generally, user equipment (UE), access network services such as phone services or Internet services, data streaming, etc., through an interface station such as a base station.

Mobile communication technologies have evolved through several generations. As an example, second generation (2G) technologies include Global System for Mobile Communications (GSM), and third generation (3G) technologies include Time Division-Synchronous Code Division Multiple Access (TD-SCDMA) and Wideband Code Division Multiple Access (WCDMA). More recently, Long Term Evolution (LTE) emerged as one of the next generation wireless communication standards, as an evolution from 3G technologies.

Siemens and China Academy of Telecommunications Technology (CATT) first developed TD-SCDMA, which is one of the five International Mobile Telecommunications-2000 (IMT-2000) standards accepted by the International Telecommunication Union (ITU) and adopted by the 3rd Generation Partnership Project (3GPP). TD-SCDMA is a TDMA/TDD system with an adaptive CDMA component operating in synchronous mode and provides both symmetric circuit-switched services (such as speech or video) as well as asymmetric packet-switched services (such as mobile Internet access). TD-SCDMA uses Time Division Duplex (TDD), in contrast to the FDD used by WCDMA. In a TD-SCDMA system, a radio sub-frame includes 7 general time slots and 3 special time slots. The 7 general time slots are referred to as timeslot 0 (TS0) to timeslot 6 (TS6), in which TS0 is a downlink time slot, TS1 is an uplink time slot, and the remaining general time slots can be dynamically configured as either downlink or uplink time slots.

In a TD-SCDMA system, the base stations, or Node Bs, directly communicate with communication terminals, and a radio network controller (RNC) controls operations of Node Bs.

In an LTE system, the base stations are referred to as eNode Bs. In an LTE system, the base stations directly communicate with communication terminals without a separate controller such as the RNC. An LTE system can implement either Time Division Duplex (TDD) or Frequency Division Duplex (FDD). In TDD LIE, communications in two opposite directions between the base station and mobile phones occur in the same frequency band but different time slots. In FDD LTE, communications in two opposite directions between the base station and mobile phones occur at the same time but in different frequency bands.

A communication terminal may move across a wide geographical area where multiple generations of communication technologies, such as GSM, TD-SCDMA, and LTE, may co-exist, and different parts of the geographical area may have different technological coverage. To obtain best network coverage, therefore, communication terminals are often dual-mode or multi-mode. For example, a dual-mode terminal may operate on an LTE network in most places, but would switch to a GSM network when the terminal moves into an area where LTE coverage is not available. As another example, a dual-mode terminal may support both 3G TD-SCDMA and 2G GSM technologies. A multi-mode terminal may support GSM, TD-SCDMA, and LTE. A dual-mode or multi-mode terminal enables communication through, for example, a slower 2G GSM network, when 3G or LTE is not available.

In an area where networks of different modes coexist, a communication terminal operating in one particular mode may measure other supported modes in preparation for a handover to another mode should the current mode become less desirable. Such handover is sometimes referred to as the inter-Radio Access Technology (inter-RAT) handover, and such measurement the inter-RAT measurement. Standard documents, such as 3GPP standards, often specify the circumstances under which a communication terminal should perform inter-RAT measurements.

In inter-RAT measurements, a communication terminal measures signals transmitted by another network to determine the signal strength, network capacity, etc., of such other network, referred to herein as the target network. Based on the measurements, the communication terminal or the network that the communication terminal currently communicates with—also referred to herein as the current network—may then determine whether the terminal should handover to the other network. To gain sufficient knowledge of the target network, the communication terminal may need to measure different signals transmitted in different frames of the target network.

When the current network and the target network operate with different radio frame structures with different frame periods, the communication terminal can often successfully measure different signals form the target network with sufficiently long measurement periods. As an example, a communication terminal communicating with a TD-SCDMA network can measure a GSM network during idle time slots of the TD-SCDMA network. As long as the measurement time is sufficient, the communication terminal can always measure a particular signal, such as a pilot signal, reference signal, or broadcast signal, that periodically appears at a particular frame position of the GSM network, because the time slot that the particular signal appears in the GSM network will eventually align with an the time slot in the TD-SCDMA network.

Inter-RAT measurement, however, cannot be easily performed when the time period of the radio frames of two different radio access systems are the same. As an example, a TDD-LTE system and a TD-SCDMA system have radio frames with the same period, i.e., 5 ms. A communication terminal operating in a TDD-LTE network may not be able to measure a particular signal of a TD-SCDMA network if the radio frame where the particular signal appears is not aligned with an idle time slot in the TDD-LTE network, and such misalignment will not change over time.

To mitigate this problem in a dual-mode terminal that supports TDD-LTE and TD-SCDMA, the concept of measurement occasion in TD-SCDMA was introduced. Specifically, the current network in communication with the terminal configures measurement occasions, during which neither the base station nor the communication terminal transmits data to each other.

In the TD-SCDMA system, measurement occasions are configured using either information element (IE) "CELL_DCH measurement occasion info LCR" or IE "Idle Interval Information." CELL_DCH refers to a state in a Radio Resource Control (RRC) connected mode. In an RRC connected mode, as opposed to an RRC idle mode, a communication terminal is usually engaging in communication services, such as telephone calls, with the network. The CELL_DCH state is one of the protocol states in the RRC connected mode that allocate a dedicate channel (i.e., DCH) for the communication terminal. LCR stands for low chip rate and refers to one of the two transmission modes (the other being HCR, i.e., high chip rate) specified in the 3GPP UMTS-TDD (Universal Mobile Telecommunication System—time division duplexing) standard. The HCR transmission mode has a higher speed than the LCR transmission mode. LCR is sometimes also regarded as an abbreviation of the TD-SCDMA in the 3GPP protocol. Detailed information may be found in the 3GPP Technical Specification 25.331, v9.9.0.

IE "CELL_DCH measurement occasion info LCR" can be configured in many controlling signals in a TD-SCDMA system, including, for example, a Radio Bearer Control message, a Cell Update Confirm message, or a Measurement Control message. IE "CELL_DCH measurement occasion info LCR" includes parameters such as Measurement Purpose, Status Flag, Timeslot Bitmap, k (hereinafter referred to as k1), Offset (hereinafter referred to as Offset1), and M_Length.

The Measurement Purpose parameter indicates the measurement purpose of the corresponding measurement occasion, such as whether the purpose is for an inter-frequency measurement of a TD-SCDMA system, a measurement of a GSM system, a measurement of an LTE system, or a combination thereof. In particular, the Measurement Purpose parameter may indicate any one of or any combination of the following five measurements: a TD-SCDMA inter-frequency measurement, a GSM carrier RSSI (Received Signal Strength Indicator), an initial BSIC (Base Station Identity Code) identification, a BSIC re-confirmation, and an E-UTRA measurement (i.e., an LTE measurement).

The Status Flag parameter indicates whether a measurement occasion pattern sequence shall be activated or deactivated. In particular, the Status Flag includes a range of enumerated values indicating whether the corresponding measurement occasion is in an activated state or a deactivated state.

The Timeslot Bitmap parameter indicates which of the time slots are allocated for measurement. In a Timeslot Bitmap, for example, Bit 0 is for timeslot 0, Bit 1 is for timeslot 1, Bit 2 is for timeslot 2, and so forth. Any bit with a value 0 may indicate that the corresponding timeslot is not used for measurement. And any bit with a value 1 may indicate that the corresponding timeslot is used for measurement.

The k1, Offset1, and M_Length parameters are used in the calculation of CELL_DCH measurement occasion. Under the RRC protocol, in a CELL-DCH state, when CELL_DCH measurement occasion pattern sequence(s) is (are) configured and activated for some specified measurement purposes, a communication terminal shall perform corresponding measurements during the timeslot(s) indicated by Timeslot Bitmap within a time period from frame $SFN_{start}$ to frame $SFN_{start}+M\_Length-1$. SFN refers to System Frame Number in a TD-SCDMA system, and the $SFN_{start}$ can be determined by equation A as follows.

$$SFN_{start} \mod(2^{k1}) = \text{Offset1} \qquad \text{Equation A.}$$

In equation A, k1 is CELL_DCH measurement occasion cycle length coefficient; the actual measurement occasion period equals to $2^{k1}$ radio frames; Offset1 is the measurement occasion position in the measurement period; M_Length is the actual measurement occasion length in frames starting from Offset1; and Mod is the modulo calculation.

In IE "CELL_DCH measurement occasion info LCR," the value of k1 can be from 1 to 9; the value of Offset1 can be from 0 to 511; and the value of M_Length can be from 1 to 512. For example, according to equation A, if k1=2, Offset1=0, M_Length=1, and Timeslot Bitmap indicates timeslot 4, then the communication terminal can perform the measurement corresponding to the Measurement Purpose within timeslot 4 in a frame that has a length of 1 radio frame, when SFN is in multiples of 4 (i.e., 0, 4, 8, and so forth).

As described above, in a TD-SCDMA system, measurement occasions can also be configured using IE "Idle Interval Information." IE "Idle Interval Information" includes two parameters: a coefficient parameter k (hereinafter referred to as k2) and Offset (hereinafter referred to as Offset2). Under Section 8.6.7.25 of the RRC protocol, if a communication terminal receives IE "Idle Interval Information," it shall store this IE and execute inter-RAT measurements, if needed, during an idle interval in System Frame Number (SFN) determined by Equation B below.

$$\text{Offset2} = SFN \mod(2^{k2}). \qquad \text{Equation B.}$$

In equation B, k2 is an coefficient parameter to calculate the idle interval period, and Offset2 is the idle interval position in a single period. The value of k2 can be from 2 to 3 and the value of Offset2 can be from 0 to 7.

According to Equation B. IE "Idle Interval Information" can configure 1 frame in every 4 or 8 frames to be a measurement occasion, during which an inter-RAT measurement can be performed. On the other hand, as described above, IE "CELL_DCH measurement occasion info LCR" can be configured so that the communication terminal may execute a particular measurement during a specified time slot that periodically appears in multiple frames. That is, IE "Idle Interval Information" configures the measurement occasion using a frame as a unit, while IE "CELL_DCH measurement occasion info LCR" configures the measurement occasion using a time slot as a unit.

Because the measurement purpose of IE "Idle Interval Information" is inter-RAT measurement, IE "Idle Interval Information" is included in IE "Inter-RAT measurement" And according to the 3GPP specification, IE "Inter-RAT measurement" is included in the "Measurement Control" information message, which is sent from the network to a communication terminal to setup, modify or release a measurement. Besides IE "Inter-RAT measurement," the "Measurement Control" information message also includes IE "Measurement Identity."

IE "Measurement Identity" is a reference number used by the network to identify a certain type of measurement. For example, the network may configure a Measurement Identity to be 1 to indicate measurement of a GSM system. The network may also configure a Measurement Identity to be 2 to indicate measurement of an LTE system. Measurement Identity configuration enables the network to manage different measurements. As an example, when the network determines that there is no need to measure the GSM system, the network may request the communication terminal to delete the Measurement Identity 1, so that the corresponding GSM measurement can be removed.

While IE "Measurement Identity" identifies the type of measurement, a network uses IE "Measurement Command" to manage the measurements performed by a communication terminal. IE "Measurement Command" can be configured as "Setup," "Modify," or "Release." The "Setup" command is for setting up a new measurement. The "Modify" command is for modifying a previously defined measurement. The "Modify" command is equivalent to setting up a measurement based on an existing measurement identity, so that the network can modify some or all of the parameters of a measurement configuration corresponding to an existing IE "Measurement Identity." As an example, through the "Modify" command, the network may request the communication terminal to delete one or more of the multiple measurement quantities that were originally configured. A measurement quantity is the quantity that a communication terminal measures on a measurement object, such as the signal strength of a neighboring cell or a network capacity. As another example, through the "Modify" command, the network may request the communication terminal to change the measurement reporting criteria, which trigger the measurement report. The "Release" command requests the communication terminal to stop a measurement and clear all information that is related to that measurement. Therefore, the "Release" command effectively deletes the measurement configuration. Similar to IE "Measurement Identity," IE "Measurement Command" is also included in the "Measurement Control" information message.

As described above, the network sends the "Measurement Control" information message to the communication terminal to setup, modify, or release a measurement. Depending on the network configuration, however, the "Measurement Control" information message may or may not include IE "Idle Interval Information," but must include IE "Measurement Identity." For example, if the network configures IE "Inter-RAT measurement," then it must configure a corresponding IE "Measurement Identity," but the network need not configure IE "Idle Interval Information." As another example, if the network does not configure an inter-RAT measurement, it may instead configure an intra-frequency measurement or intra-RAT inter-frequency measurement. In any case, the "Measurement Control" information message must include IE "Measurement Identity" to indicate the type of measurements, such as a GSM measurement, a TD-SCDMA measure, an LTE measurement, etc. But the "Measurement Control" information message may or may not include IE "inter-RAT measurement," or IE "Idle Interval Information."

While the measurement occasions configuration as described above may mitigate the inter-RAT measurement problem in a dual-mode terminal, it does not take into account different circumstances under which a communication terminal may perform measurements. As an example, the 3GPP protocol requests that a communicate terminal executes an inter-RAT measurement based on the configuration of IE "Idle Interval Information." As described above, while the network that configures IE "Inter-RAT measurement" must configure the corresponding IE "Measurement Identity," it may not configure IE "Idle Interval Information." Without IE "Idle Interval Information," the communication terminal may not have sufficient measurement occasions to perform the inter-RAT measurement.

As another example, the 3GPP protocol does not specify under what circumstances a configuration of IE "Idle Interval Information" is valid. For instance, it is unclear when a communication terminal can delete a measurement occasion that is configured in IE "Idle Interval Information." In particular, a network may use the same measurement occasion configured in IE "Idle Interval Information" corresponding to different measurement identities and it is unclear whether the communication terminal can delete some of the same measurement occasions.

As yet another example, under the current 3GPP protocol, measurement occasions may also be wasted. For instance, a network may configure one-eighth of the idle interval for GSM measurements and one-fourth of the idle interval for LTE (including TDD-LTE or FDD-LTE or both) measurements. However, when a communication terminal has no neighboring LTE cell, the measurement occasions configured for the LTE measurements will be wasted. On the other hand, the measurement occasions configured for the GSM system may be insufficient, thus decreasing the performance of the GSM system measurement.

As yet another example, even if the measurement occasions are configured for inter-RAT measurements, decrease in data throughput may be unacceptable. For instance, according to the relevant communication protocols, when inter-RAT measurements are configured by using IE "Idle Interval Information," the measurement occasions are configured to be 1 frame in every 4 or 8 frames. During those measurement occasions, the protocol requires that no data can be communicated. Thus, if the measurement occasions are configured using IE "idle interval information," merely one type of inter-RAT measurement can result in a 25% or 12.5% loss (corresponding to 1 every 4 frames or 1 every 8 frames, respectively) of data traffic throughput.

If, in a communication terminal, more than two different radio access systems are present and are configured to use different idle intervals for measurements, then each inter-RAT measurement can result in a decrease of 25% or 12.5% in data throughput. In other words, if there is "N" number of different radio access systems, the total throughput loss can be 25%*N or 12.5% N. While the throughput loss may be reduced by increasing the measurement intervals or increasing the measurement quantities in the measurement occasions, these approaches may cause the measurement occasions to be insufficient for some measurements.

The above examples illustrate that the current inter-RAT measurement techniques often result in unreasonable configuration or allocation of measurement occasions, causing inefficient use or waste of the limited measurement occasion resources, poor measurement performance, low data traffic throughput, and increased time delays in data transmission. Therefore, there is a need for a method that efficiently and reasonably configures the measurement occasions and/or provides an improved measurement performance.

SUMMARY

According to a first aspect of the present disclosure, there is provided a method for measuring one or more measurement quantities, wherein the measurement quantities correspond to a measurement identity, the method comprising determining whether measurement of the measurement quantities can be performed in a first measurement occasion corresponding to the measurement identity; and if measurement of the measurement quantities cannot be performed in the first measurement occasion, measuring the measurement quantities using one or more other measurement occasions, wherein the one or more of the other measurement occasions correspond to at least one other measurement identity.

According to a second aspect of the present disclosure, there is provided a communication terminal for measuring one or more measurement quantities, wherein the measurement quantities correspond to a measurement identity, comprising: a first determination unit that determines whether measurement of the measurement quantities can be performed in a first measurement occasion corresponding to the measurement identity; and an execution unit that measures the measurement quantities using one or more other measurement occasions when the first determination unit determines measurement of the measurement quantities cannot be performed in the first measurement occasion, wherein one or more of the other measurement occasions correspond to at least one other measurement identity.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the subject matter and, together with the description, serve to explain the principles of the subject matter.

DETAILED DESCRIPTION OF THE DISCLOSURE

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Relevant communication protocols require a communication terminal to be able to perform multiple types of measurements. For example, some communication protocols may require both inter-RAT measurement, i.e., measurement between different systems, and intra-frequency measurement, i.e., measurement within the same system. Embodiments of various measurement techniques described below can apply equally to one or more of an inter-RAT measurement, such as a measurement with respect to TD-SCDMA, GSM or LTE systems in a communication terminal, an intra-RAT inter-frequency measurement, such as a measurement of a neighboring cell in a TD-SCDMA system, an intra-frequency measurement, and any combination thereof. Correspondingly, the communication terminals described below can support multiple communication modes, such as TD-SCDMA, GSM, and LTE. For example, the communication terminal may be any one of a mobile phone or a general User Equipment (UE) that supports multiple communication modes.

Figure 1:
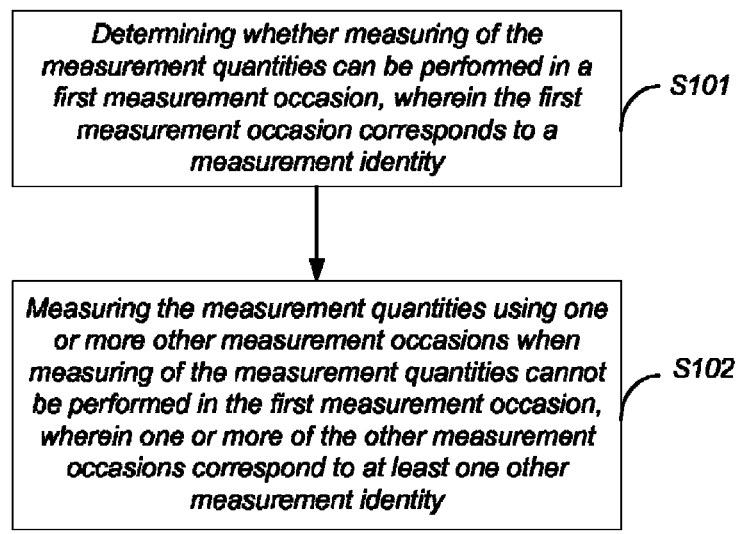
FIG. 1 illustrates a method for performing measurement in a communication terminal, consistent with an exemplar)/embodiment.

FIG. 1 illustrates a method 100 for performing measurement in a communication terminal, consistent with an exemplary embodiment. The communication terminal measures one or more measurement quantities corresponding to a measurement identity. In step S101, the communication terminal determines whether the measurement can be performed in a first measurement occasion corresponding to the measurement identity. The first measurement occasion can be a time period for measuring of the one or more measurement quantities. In step S102, when the communication terminal determines that the measurement cannot be performed in the first measurement occasion, it measures the measurement quantities using one or more other measurement occasions corresponding to at least one other measurement identity.

Because measurement occasions are configured by the network corresponding to one or more particular measurement identities, the communication terminal thus determines in step S101 whether the measurement corresponding to a particular measurement identity can be performed or completed in the first measurement occasion.

For example, if the first measurement occasion is insufficient to complete the measurement of the measurement quantities, the communication terminal may determine in step S101 that the measurement cannot be performed within the first measurement occasion.

If the measurement occasion is improper, the communication terminal may determine in step S101 that it cannot perform the measurement. A measurement occasion may be improper because of a lack of measurable neighboring cell, a sudden problem or fluctuation of the network signals, the existence of a better measurement occasion, and/or a better use of the measurement occasion for another signal.

Furthermore, a measurement occasion may be both insufficient and improper for measuring of the one or more measurement quantities.

If the communication terminal determines in step S101 that the measurement cannot be performed in the first measurement occasion, the communication terminal measures the measurement quantities using one or more other measurement occasions corresponding to at least one other measurement identity. As described above, in some circumstances, the measuring of the measurement quantities corresponding to a measurement identity cannot be performed if the measurement occasion is insufficient to perform the measurement of the measurement quantities. Consequently, in order to perform the measurement, not only the measurement occasion for this particular measurement identity is needed, but also one or more other measurement occasions corresponding to other measurement identities may be needed.

As an illustration of an insufficient measurement occasion configuration, a network may configure measurement occasion a for measurement quantity A that corresponds to measurement identity 1, and measurement occasion b for measurement quantity B that corresponds to measurement identity 2. When the communication terminal determines that the measuring of measurement quantity A cannot be completed within the measurement occasion a, the communication terminal may use measurement occasion b in addition to measurement occasion a, to perform the measurement. That is, the communication terminal may use both measurement occasion a and measurement occasion b to perform the measuring of measurement quantity A. Similarly, when the communication terminal determines that measuring of measurement quantity B cannot be completed within the measurement occasion b, it can use both measurement occasion a and measurement occasion b to perform the measurement.

If the network also configures measurement occasion c for measurement quantity C corresponding to measurement identity 3, then measurement quantity A or measurement quantity B can also be measured using measurement occasion c in addition to measurement occasions a and b. One of ordinary skill in the art would appreciate that in order to perform the measuring of a measurement quantity, any number of or any portion of the measurement occasions may be used or combined. One of ordinary skill in the art would also appreciate that regardless of whether measurement of a measurement quantity can be performed within its configured measurement occasion, other measurement occasions may still be used in addition to or as an alternative to the configured measurement occasion, as will be described below.

As an illustration of an improperly configured measurement occasion, similar to the one above, the network may configure measurement occasion a for measurement quantity A that corresponds to measurement identity 1, and measurement occasion b for measurement quantity B that corresponds to measurement identity 2. When the communication terminal determines that measuring of measurement quantity A within the measurement occasion a is improper, the communication terminal may instead use measurement occasion b to perform the measurement of measurement quantity A, provided that measuring of measurement quantity A can be performed within measurement occasion b. Likewise, when the communication terminal determines that measuring of measurement quantity B within the measurement occasion b is improper, the communication terminal may instead use measurement occasion a to perform the measuring of measurement quantity B, provided that measuring of measurement quantity B can be performed within measurement occasion a. One of ordinary skill in the art would appreciate that the communication terminal can dynamically determine a proper measurement occasion for any given number of measurement quantities in any manner.

As illustrated above, while the communication terminal may measure the measurement quantities according to the corresponding measurement occasion configured by the network, it can still modify or adjust the measurements being performed within the measurement occasions when the network's configuration of measurement occasions corresponding to the measurement quantities is insufficient or improper, i.e., unreasonable. By adjusting or modifying the measurement tasks with respect to the measurement occasions, the communication terminal, however, does not change the measurement occasions configured by the network, but instead optimizes the required measurements with respect to the network-configuration measurement occasions so that the measurements can be performed properly and efficiently. Hence, the optimization reduces or prevents the waste of the limited measurement occasion resources and improves efficiency.

The communication terminal may perform the optimization in several different manners depending on the circumstances, which will be described below in more details.

As illustrated above, in some exemplary embodiments, when the measurement occasion is insufficient for the communication terminal to perform the measuring of one or more measurement quantities corresponding to a measurement identity, other measurement occasions may be used. In these embodiments, the other measurement occasions may be greater than that are required to measure the measurement quantities corresponding to the other measurement identities. That is, there are excessive measurement occasions, which can be well utilized by communication terminal. A measurement occasion is greater than that is required when the time period configured for that measurement occasion (e.g., 10 ms) is greater than the time period required (e.g., 5 ms). Conversely, a measurement occasion is less than that is required when the time period configured for that measurement occasion (e.g., 5 ms) is less than the time period required (e.g., 10 ms). Using the above illustration as an example, if the measurement occasion a for measurement quantity A corresponding to measurement identity 1 is 5 ms, and 10 ms is required to complete the measuring of measurement quantity A, the communication terminal would need to use other measurement occasions in order to perform the measuring of measurement quantity A. The communication terminal, however, needs to determine which of the other measurement occasion or occasions to use. For example, if measurement occasion b for measurement quantity B corresponding to measurement identity 2 is 5 ms, and the measurement occasion required to complete the measuring of measurement quantity B is 5 ms or less, then combining of measurement occasions a and b may be sufficient to perform the measuring of measurement quantity A. That is, the communication terminal now have 10 ms for measuring of the measurement quantity A, in which 5 ms is from measurement occasions a and another 5 ms is from measurement occasion b. However, using the 5 ms from measurement occasion b causes the communication terminal to have insufficient measurement occasions for the measuring of measurement quantity B. In other words, measurement occasions a and b combined are not sufficient for the communication terminal to perform both measurement quantity A and B.

On the other hand, if the network configured measurement occasion c for measurement quantity C corresponding to measurement identity 3 to be 15 ms, and only 10 ms is required to complete the measuring of measurement quantity C, the communication terminal can perform measuring of both measurement quantities A and C within the combined measurement occasions a and c. This is because the communicate terminal can perform the measuring of measurement quantity A by using measurement occasion a, which is 5 ms, and also using the extra 5 ms that is no used in the measurement occasion c. Consequently, in the above illustration, the communication terminal can make proper determination to use both measurement occasions a and c to perform the measurement of measurement quantity A, instead of using measurement occasions a and b.

The above example illustrates that a measurement occasion, such as measurement occasion c, has unused measurement time (e.g., 5 ms) because the network configuration of the measurement occasion c is excessive. However, measurement occasions may also be unused for any other reasons. Using the above example as an illustration, if the communication terminal determines that using measurement occasion b to perform the measuring of measurement quantity B corresponding to measurement identity 2 is improper, it may perform the measurement of measurement quantity B in any measurement occasion other than the measurement occasion b. In this case, the 5 ms of measurement occasion b also becomes an unused measurement occasion. And the communication terminal may, for example, use measurement occasion b and measurement occasion a to perform the measuring of measurement quantity A.

As illustrated above, in general, any unused measurement occasion may be utilized to perform measurements of measurement quantities when such unused measurement occasion is equal to or greater than the difference between what the measurement requires and the measurement occasion already configured by the network for the measurement. Consistent with embodiments of the present disclosure, the unused measurement occasion can be used for measuring one or more other measurement quantities so that the limited measurement occasion resources can be better utilized.

As described above, when a measurement occasion is insufficient for performing a measurement of one or more measurement quantities corresponding to a measurement identity, the communication terminal may perform the measurement by using other measurement occasions. The insufficiency of the measurement occasion may or may not be foreseeable or known beforehand. If the insufficiency is known or foreseeable, an appropriate adjustment or re-arrangement of the measurement occasions with respect to the measurement quantities may be made at the time when the communication terminal receives the measurement occasions, i.e., at the time before the actual measurement begins. Alternatively, an appropriate adjustment or re-arrangement can also be made during the measurement.

Similarly, in a situation where a measurement occasion is improper for the communication terminal to perform measuring of one or more measurement quantities corresponding to a measurement identity, the improperness may or may not be foreseeable or known. As noted above, a measurement occasion may be improper because of a lack of measurable neighboring cell, a sudden problem or fluctuation of the network signals, the existence of a better measurement occasion, and/ or a better use of the measurement occasion for another signal. Some of these reasons may be foreseeable or known beforehand and therefore an appropriate adjustment or re-arrangement may be made when a communication terminal receives the measurement occasion. An appropriate adjustment or re-arrangement can enable effective use of the limited measurement occasion resources and thus enhances the measurement performance. On the contrary, if the reasons that causing the improperness are not foreseeable or are unknown beforehand, it may be difficult to make adjustment or arrangement prior to the execution of the measurement task. And an appropriate adjustment based on the actual circumstances will need to be made by the communication terminal during the measurements. For example, the network may have configured a measurement occasion such that it corresponds to an LTE system. The communication terminal, however, may determine that there is no LTE neighboring cell at the current location. In this situation, the measurement occasion needs to be re-allocated or re-arranged so that it can be used for measuring other measurement quantities and not wasted.

Referring still to FIG. 1, in step S102, in some embodiments, the measurement of the one or more measurement quantities using one or more other measurement occasions may include a substep S102a (not shown) and a substep S102b (not shown). In substep S102a, the communication terminal re-allocates the measurement occasions to measurement quantities corresponding to each measurement identity. The measurement occasions may include at least one of the first measurement occasion and the other measurement occasions. In substep S102b, the communication terminal measures the measurement quantities based on the re-allocated measurement occasions.

In substep S102a, the communication terminal can re-allocate the measurement occasions in different manners. In some exemplary embodiments, the communication terminal may re-allocate the measurement occasions by swapping two measurement occasions corresponding to two measurement identities. For example, a network may configure a measurement occasion a corresponding to measurement identity 1, and configure another measurement occasion b corresponding to measurement identity 2. However, in some circumstances, the required measurement occasion for measuring the measurement quantity corresponding to measurement identity 1 may be b; and the required measurement occasion for measuring the measurement quantity corresponding to measurement identity 2 may be a. In this case, in order to satisfy the requirements for measuring both measurement identities 1 and 2, the communication terminal can swap the measurement occasions a and b. That is, measurement occasion a can be re-allocated to the measurement quantity corresponding to measurement identity 2, and measurement occasion b can be re-allocated to the measurement quantity corresponding to measurement identity 1. One of ordinary skill in the art would appreciate that re-allocation is not limited to two measurement occasions and is not limited to swapping operation. More than two measurement occasions can be re-allocated for multiple measurement identities. The re-allocation of measurement occasions can result in a proper allocation of the measurement occasions for multiple measurements, and therefore reduce or prevent waste of the limited measurement occasions resources, improving efficiencies and performances.

In some other exemplary embodiments, the re-allocation of measurement occasions depends on the measuring requirements for each measurement quantity corresponding to each measurement identity. For example, a network may configure measurement occasion a for measurement quantity A corresponding to measurement identity 1 as 10 ms, measurement occasion b for measurement quantity B corresponding to measurement identity 2 as 5 ms, and measurement occasion c for measurement quantity C corresponding to measurement identity 3 as 15 ms. The measurement occasions required by measuring of measurement quantities A, B, and C, however, may be 15 ms, 5 ms, and 10 ms, respectively. One way of re-allocation according to the required measurement occasions may be exchanging or swapping the measurement occasions, as described above, such that measurement quantity A is measured at measurement occasion c; measurement quantity C is measured at measurement occasion a; and measurement quantity B is measured at measurement occasion b. In an alternative manner, because measuring of measurement quantity A requires 15 ms, the communication terminal may use measurement occasion a, which is 10 ms, and the extra 5 ms from measurement occasion c (measurement occasion c is configured to be 15 ms, but measuring of measurement quantity C only requires 10 ms). When measurement quantity A is measured in this manner, measurement quantities B and C can be measured at measurement occasions b and c, respectively, according to their original network configuration. Regardless of the manner the measurement occasions are allocated, re-allocating of the measurement occasions based on the required measurement occasions for each measurement quantity may greatly enhance the measurement quality and performance.

In substep S102a (not shown in FIG. 1), the communication terminal can also re-allocate the measurement occasions based on priority of the measurement quantities. The priority may be configured by the communication terminal or by the network. For example, the communication terminal may configure priority if the actual situation continues to change. The communication terminal can configure the priority of each individual measurement quantity according to the configuration of the neighboring cells, the quality of the network signals, and the difficulty of measurement. As an example, if an LTE neighboring cell may not exist, the communication terminal may lower the priority of the LTE system measurement and raise the priority of the GSM system measurement.

As another example of setting priority, if an LTE system's signal may be stronger than a GSM system's signal in a neighboring cell, and if the measurement occasions for both systems can meet the measurement requirements, the communication terminal may prioritize the measurement of the LTE system over that of the GSM system. If, however, the measurement occasion for the LTE system is determined to be insufficient to perform the measurement, then the measurement of the GSM system may take priority.

Priority may also depend on the degree of measurement difficulty. Assuming there are three measurement quantities, namely measurement quantities A, B, and C, with different degrees of difficulty in measurement. For example, the measurement that requires the minimum amount of measurement occasion may be considered the least difficult, and the measurement that requires the maximum amount of measurement occasion may be considered the most difficult. If the degree of measurement difficulty is ranked in the order of A, C, and B, i.e., measurement quantity A is the most difficult and measurement quantity B is the least difficult, then priority may be given to the measuring of measurement quantity A. If the measurement occasion for measurement quantity A alone is not sufficient to perform the measurement, the other measurement quantities, such as measurement quantity C, which has extra measurement occasions, can be combined with the measurement occasion for measurement quantity A for the measurement of measurement quantity A. After the communication terminal performs the measuring of measurement quantity A, the measuring for measurement quantities C and B can be performed in their respective order.

As noted above, priority may also be configured by determining whether the measurement occasion may be more proper for measuring other measurement quantities. For example, if a network configures 8 consecutive frames as measurement occasions, designated as the 1st frame up to the 8th frame, the network may allocate the 1st frame and the 4th frame for measuring the GSM system, and allocate all of the other frames for measuring the LTE system. If, however, the communication terminal determines that the measuring of the GSM system can be performed within the 1st and 2nd frames, then the measurement tasks of the 2nd and the 4th frames can be swapped, i.e., the 2nd frame can now be used for measuring the GSM system and the 4th frame can be used for measuring the LTE system. In other words, the measuring of the GSM system can now be performed within two consecutive frames, e.g., the 1st and 2nd frames, after which the subsequent 6 consecutive frames (the 3rd frame to the 8th frame) can be used for measuring the LTE system. Measuring the same system in consecutive frames may have the benefit of enhancing the measurement efficiency. In the above example, because the communication terminal determines that the 2nd frame is more proper for measuring the GSM system, the measurement quantity in the 4th frame is thus re-allocated to the 2nd frame to be measured. In other words, the priority of the measurement quantity that is configured for the 4th frame for measuring the GSM system can be considered higher and the order of measurements can be adjusted accordingly.

In the above example, the communication terminal may determine that the 2nd frame is more proper because of various reasons. For instance, in the 2nd frame, the signals of the GSM system may be more readily measured. The signals of GSM system may also have greater likelihood to be captured or encountered in either the 1st frame or the 2nd frame. Under these circumstances, if the communication terminal still performs the measurements according to the measurement occasions, i.e., measuring the GSM system in the 1st frame and measuring the LTE system in the 2nd frame, then the limited measurement occasion resources may be wasted. From the above description of illustrations and embodiments, method 100 in a communication terminal for measuring one or more measurement quantities can result in an efficient utilization of the measurement occasions, therefore avoiding or preventing the reduction of measurement performance caused by the network's improper allocation of measurement occasions to the different measurement quantities.

Figure 2:
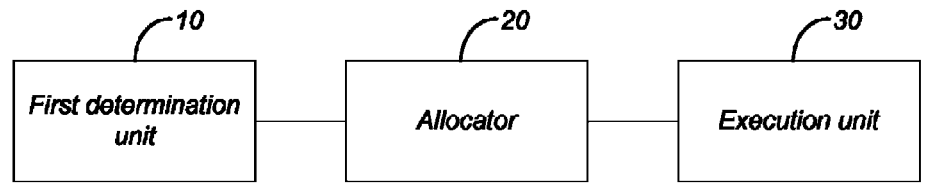
FIG. 2 illustrates an exemplary block diagram showing components for measurement in a communication terminal, consistent with the method as shown in FIG. 1.

FIG. 2 illustrates an exemplary block diagram showing components for measurement in a communication terminal 200, consistent with the method as shown in FIG. 1. In FIG. 2, communication terminal 200 includes determination unit 10, allocator 20, and an execution unit 30. Determination unit 10 determines whether measurement of the measurement quantities can be performed in a first measurement occasion corresponding to the measurement identity. Allocator 20 is coupled to determination unit 10 and re-allocates measurement occasions to measurement quantities corresponding to each measurement identity. The measurement occasions include at least one of the first measurement occasion and the other measurement occasions. Execution unit 30 is coupled to allocator 20 and measures the measurement quantities using one or more other measurement occasions when determination unit 10 determines measuring of the measurement quantities cannot be performed in the first measurement occasion. The one or more of the other measurement occasions correspond to at least one other measurement identity. Execution unit 30 may also measure the measurement quantities based on the re-allocated measurement occasions. Communication terminal 200 as shown in FIG. 2 can perform various steps as discussed corresponding to FIG. 1 and thus will not be repeated here.

Figure 3:
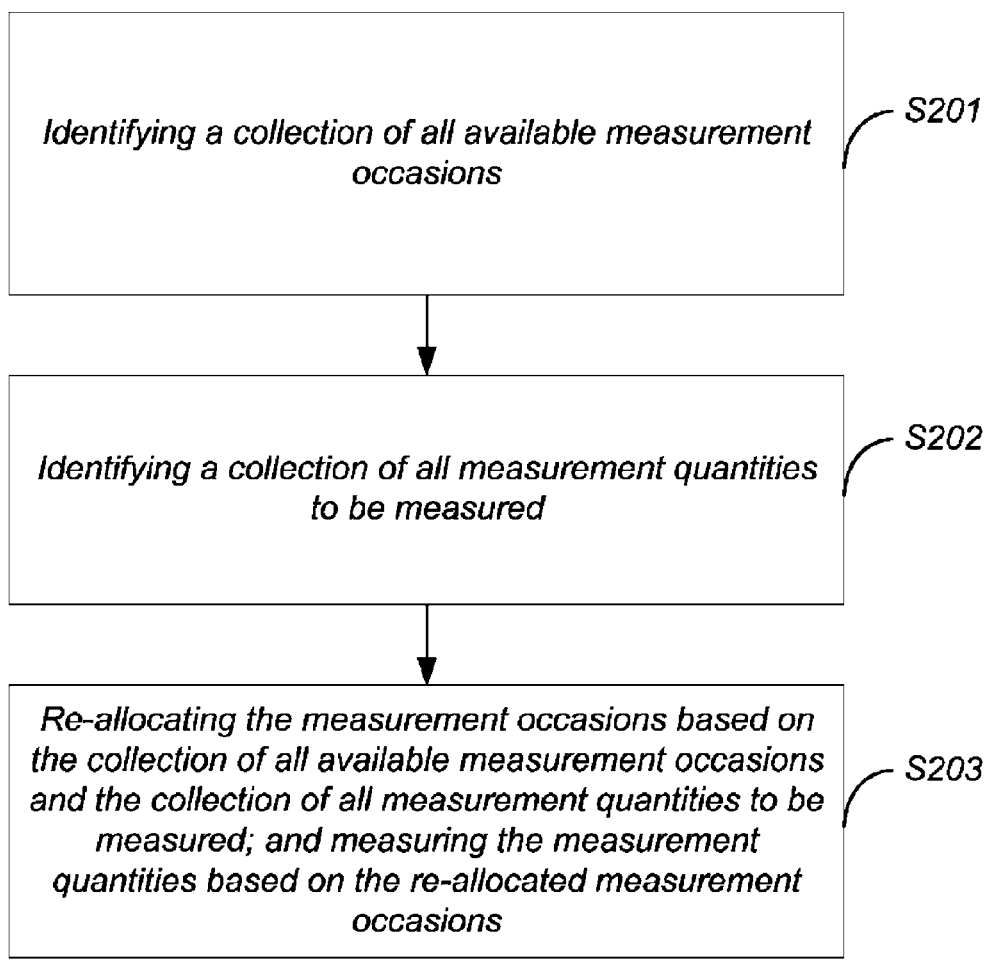
FIG. 3 illustrates another method for performing measurement in a communication terminal, consistent with another exemplary embodiment.

FIG. 3 illustrates another method 300 for performing measurement in a communication terminal, consistent with another exemplary embodiment. In some exemplary embodiments, in a step prior to S201 (not shown), the communication terminal receives and stores one or more information elements (IEs), such as IE "Idle Interval Information," its corresponding IE "Measurement Identity," and IE "CELL_DCH Measurement Occasion Info LCR." The communication terminal may also receive and store the measurement task information, including the measurement information and the measurement purposes information. The measurement information and the measurement purposes information are included in IE "Inter-RAT Measurement" and/or IE "Inter-Frequency Measurement." The measurement task information includes measurement quantities, measurement purposes, measurement conditions, and measurement reporting criteria, which triggers the measurement report.

Referring to FIG. 3, after the communication terminal receives and stores the measurement task information and measurement occasion information, in step S201, the communication terminal identifies the measurement occasions to generate a collection of the measurement occasions, which includes available measurement occasions. In step S201, the communication terminal may first determine which of the measurement occasions under the current configuration may be available for measuring. For example, the available measurement occasions may include all idle intervals and the time slots that can be used for measuring, which may periodically appear in multiple frames in an activated state. After the communication terminal determines all the available measurement occasions, it identifies the available measurement occasions to generate a collection. In some exemplary embodiments, in step S201, in addition to the collection of the available measurement occasions, the communication terminal may also identify the measurement identities corresponding to each of the measurement occasions, which are indicated in IE "CELL_DCH Measurement Occasion Info LCR" and/or IE "Idle Interval Information." Moreover, for IE "CELL_DCH Measurement Occasion Info LCR," the communication terminal may also statistically combining the status indicators of the measurement identities. On the other hand, for IE "Idle Interval Information," the communication terminal may not need to identify the status indicators, because the default status indicators of the measurement identities are set to be "activated."

Referring still to FIG. 3, in step S202, the communication terminal identifies measurement quantities to generate a collection of the measurement quantities, which includes required measurement quantities. In other words, in step S202, the communication terminal can determine a total measurement task. In step S203, the communication terminal re-allocates the measurement occasions to the measurement quantities based on the collection of the measurement occasions that is generated in step S201 and the collection of measurement quantities that is generated in step S202. In some embodiments, the communication terminal may re-allocate the collection of the measurement occasions to the measurement quantities according to the measuring requirement for each of the measurement quantities. In addition, the re-allocation in step S203 may be performed in a manner that is described in various embodiments corresponding to FIG. 1 above, and will not be repeated here. The re-allocating in step S203 is not limited by the relationships between the measurement occasions and the corresponding measurement quantities.

Moreover, in step S203, the communication terminal may also adjust the collection of the measurement occasions based on one or more changes of the network configuration. That is, when the network modifies or deletes one or more measurement quantities corresponding to a given measurement identity, the communication terminal also adjusts or updates the collection of the measurement quantities according to the change that network made. As set forth above, in addition to statistically combining measurement occasions, the communication terminal may also identify the measurement identities corresponding to each of the measurement occasions, which are indicated in IE "CELL_DCH Measurement Occasion Info LCR" and/or IE "Idle interval Information." Moreover, for IE "CELL_DCH Measurement Occasion Info LCR," the communication terminal may also identify the status indicators of the measurement identities. Consequently, in some embodiments, adjusting of the collection of the measurement occasions based on one or more changes of the network configuration may include the following operations involving the operations of measurement identities and the status indicators.

As an example of an adjusting operation, when the network releases a certain measurement identity, the communication terminal inspects corresponding idle interval configured in IE "Idle Interval Information," and deletes the released measurement identity corresponding to the idle interval from the measurement identities. This step of inspecting and deleting a released measurement identity may be repeated and the communication terminal determines whether all measurement identities corresponding to the idle interval are deleted. If all measurement identities are deleted, the following operations are performed. When measurement occasions configured in IE "CELL_DCH Measurement Occasion Info LCR" are activated, the communication terminal deletes, from the collection of the measurement occasions, measurement occasions that are not included in the activated measurement occasions and not overlapping with other idle intervals configured by other IEs "Idle Interval Information." And when the measurement occasions configured in IE "CELL_DCH Measurement Occasion Info LCR" are inactivated, the communication terminal modifies status indicators of the inactivated measurement occasions to be inactivated, and deletes the inactivated measurement occasions that are not overlapping with the other idle intervals configured by the other IEs "Idle Interval Information."

As another example of an adjusting operation, when the network configuration modifies the measurement occasions corresponding to one or more of the measurement identities, the communication terminal releases the measurement identity by performing all the steps as described in the above example. Afterwards, the communication terminal identifies the modified measurement occasions with the collection of the measurement occasions, and records a relationship of the modified measurement occasions and the one or more of the corresponding measurement identities.

In the above examples and embodiments, a measurement occasion that is configured by the network may have different numbers of measurement identities corresponding to different time slots or frames within the measurement occasion. Consequently, the release or modification of a particular measurement identity does not necessarily mean that its corresponding measurement occasion will be deleted or modified. As an illustration, in the IE "Idle Interval Information" that corresponds to the measurement identity 1, if k2=2 and Offset2=0, then the frames of which the SFN is the multiples of 4 (such as 0, 4, 8, 12, 16, etc.) are the idle intervals. In the IE "Idle Interval Information" that corresponds to the measurement identity 2, if k2=3 and Offset2=0, then the frames of which the SFN is the multiples of 8 (such as 0, 8, 16, etc.) are the idle intervals. In addition to IE "Idle Interval Information," the network may have also configured IE "CELL_DCH Measurement Occasion Info LCR," and set the status indicator to be activated. Consequently, if k1=2, Offset1=0, and M_Length=1, the Timeslot Bitmap parameter that is configured in IE "CELL_DCH Measurement Occasion Info LCR" indicates timeslot 4. That is, the measurement occasions are configured to be timeslot 4 of the frames of which the SFN is the multiples of 4, such as 0, 4, 8, 12, 16, etc.

As a result, in the above illustration, the frames of which the SFN is in the multiples of 8 (such as 0, 8, 16, etc.) correspond to both measurement identity 1 and measurement identity 2, while the frames of which the SFN is in multiples of 4 (such as 4 and 12) but not in multiples of 8 correspond only to measurement identity 1. In addition, the timeslot 4 in the frames of which the SFN is in multiples of 4 (such as 0, 4, 8, 12, 16, etc.) also corresponds to an activated measurement occasion. Consequently, when deleting measurement identity 1, the frames of which the SFN is in multiples of 8 (such as 0, 8, 16, etc.) will not be deleted from the collection of the measurement occasions because they also correspond to measurement identity 2.

In addition, if the measurement occasion included in IE "CELL_DCH Measurement Occasion Info LCR" remains activated, the timeslot 4 in the frames of which the SFN is in multiples of 4 (such as 4 and 12, etc.) but not in multiples of 8 will not be deleted from the collection of the measurement occasions. However, the other timeslots (i.e., timeslots other than the timeslot 4 in the frames of which the SFN is in multiples of 4 (such as 4 and 12, etc.)) will be deleted from the collection of the measurement occasions. If, however, the network configures the status indicator in IE "CELL_DCH Measurement Occasion Info LCR" to be inactivated, and if k1=2, Offset1=0, and M_Length=1, then the collection of the measurement occasions will only include frames of which the SFN is in multiples of 8 (such as 0, 8, 16, etc).

The aforementioned example of adjusting of the collection of the measurement occasions illustrates the method by which the communication terminal can determine whether a network configuration in IE "Idle Interval Information" is invalid. That is, the communication terminal can determine when a configuration in IE "Idle Interval Information" can be deleted. In particular, as illustrated above, the network may have the same measurement occasion configuration in IE "Idle Interval Information" corresponding to different measurement identities. Thus, the method of adjusting the collection of the measurement occasions illustrated in the above example can enable the communication terminal to determine whether a measurement occasion corresponding to a particular measurement identity can be deleted or modified, when the measurement identity is released or modified.

In step 203, after all of the measurement quantities are measured, the measurement results can be reported to the upper layer of the communication terminal in compliance with the relevant protocol. The upper layer refers to the layer(s) above the physical layer in the multiple protocol layers structure of a communication terminal.

Referring still to FIG. 3, method 300 enables the communication terminal to make efficient use of the available measurement occasions to perform measurements of all of the measurement quantities configured by the network. Method 300 is not subject to the limitations of the network configuration, in which certain measurements have one-to-one correspondence to the measurement identities. Method 300 can also provide proper and effective adjustment of the collection of the measurement occasion so that the performances of the inter-frequency measurements and inter-RAT measurements are stabilized.

Figure 4:
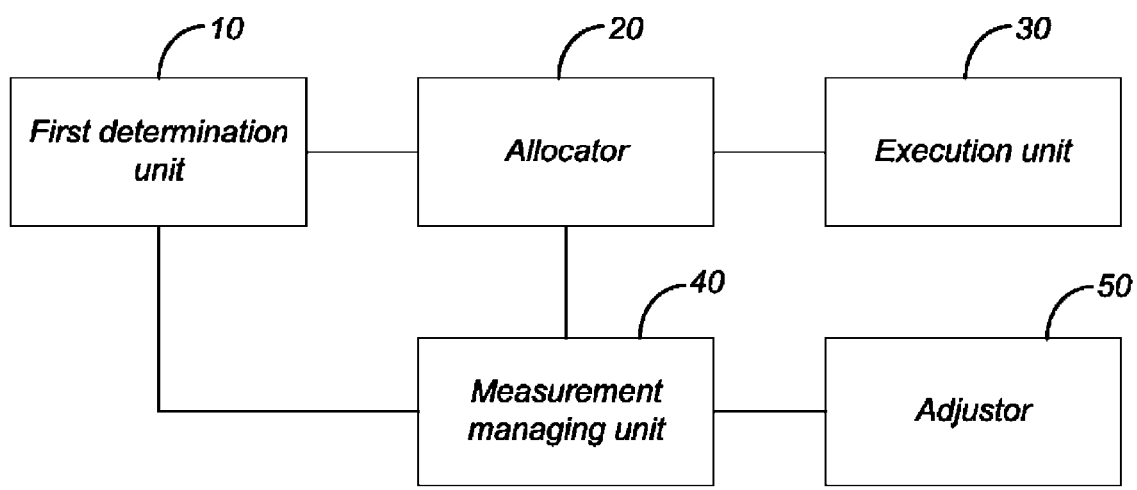
FIG. 4 illustrates another exemplary block diagram showing components for performing measurement in a communication terminal, consistent with the method as shown in FIG. 2.

FIG. 4 illustrates another exemplary block diagram showing components for performing measurement in a communication terminal 400, consistent with the method as shown in FIG. 2. Communication terminal 400 includes first determination unit 10, allocator 20, execution unit 30, measurement managing unit 40, and adjustor 50. First determination unit 10 and execution unit 30 are the same or substantially the same as those shown in FIG. 2. Thus, details of these components will no be repeated here. As described above, allocator 20 is coupled to both first determination unit 10 and execution unit 30, and can re-allocate measurement occasions to measurement quantities corresponding to each measurement identity. Allocator 20 can perform the re-allocation notwithstanding the limitation of the network configuration. For example, allocator 20 can re-allocate the measurement occasions based on measurement occasions required by measuring of the measurement quantities corresponding to each measurement identity. Allocator 20 can also re-allocate the measurement occasions based on priority of the measurement quantities corresponding to each measurement identity.

Measurement managing unit 40 is coupled to first determination unit 10 and allocator 20. Measurement managing unit 40 can be one physical unit, or can comprise multiple sub-units. For example, measurement managing unit 40 can include a measurement occasion mixer (not shown) that identifies the measurement occasions to generate a collection of the measurement occasions, wherein the collection of the measurement occasions comprises available measurement occasions; and a measurement quantity mixer (not shown) that identifies measurement quantities to generate a collection of the measurement quantities, wherein the collection of the measurement quantities comprises required measurement quantities. Moreover, the measurement occasion mixer may include a statistical combiner that identifies measurement identities corresponding to each of the measurement occasions indicated in at least one of an Information Element (IE) "CELL_DCH Measurement Occasion Info LCR" and an IE "Idle Interval Information," and identifies status indicators of the measurement identities corresponding to each of the measurement occasions indicated in the IE "CELL_DCH Measurement Occasion Info LCR."

Measurement managing unit 40 provides the collection of the measurement occasions and the collection of measurement quantities to allocator 20, which re-allocates the measurement occasions based on the collection of the measurement occasions and the collection of the measurement quantities. After the re-allocation, allocator 20 provides the re-allocated configuration to execution unit 30, which perform the measuring of the measurement quantities based on the re-allocated measurement occasions.

Adjustor 50 is coupled to measurement managing unit 40. Adjustor 50 adjusts the collection of the measurement occasions provided by measurement managing unit 40 based on one or more changes of the network configuration. Adjustor 50 can be one physical unit, or can comprise multiple sub-units. For example, adjustor 50 may include a first sub-adjustor (not shown) that inspects the corresponding idle interval configured in an IE "Idle Interval Information," when the network configuration releases one or more of the measurement identities or modifies the measurement occasions corresponding to one or more of the measurement identities. The first sub-adjustor (not shown) also deletes the released measurement identities corresponding to the idle interval and determines whether all measurement identities corresponding to the idle interval are deleted. When all of the measurement identities corresponding to the idle interval are deleted, and when measurement occasions configured in an Information Element (IE) "CELL_DCH Measurement Occasion Info LCR" are activated, the first sub-adjustor deletes, from the collection of the measurement occasions, measurement occasions that are not included in the activated measurement occasions and not overlapping with other idle intervals configured by other IEs "Idle Interval Information."

Adjustor 50 may also include a second sub-adjustor (not shown) that modifies status indicators of the inactivated measurement occasions to be inactivated, and deletes the inactivated measurement occasions that are not overlapping with the other the intervals configured by the other IEs "Idle Interval Information," when the measurement occasions configured in the IE "CELL_DCH Measurement Occasion Info LCR" are inactivated. Moreover, adjustor 50 may also include a third sub-adjustor (not shown) that identifies the modified measurement occasions with the collection of the measurement occasions, and records a relationship of the modified measurement occasions and the one or more corresponding measurement identities, when the network configuration modifies the measurement occasions corresponding to one or more of the measurement identities. Communication terminal 400 as shown in FIG. 4 can perform various steps as discussed corresponding to FIGS. 1 and 3 and thus will not be repeated here.

One of ordinary skill in the art would appreciate that features of the components illustrated in FIGS. 2 and 4 and described above can be implemented in either hardware or software. For example, allocators 20 and measurement managing unit 40 may be implemented in hardware as combinational and/or sequential logic circuits; or, alternatively, implemented in software that, for example, optimizes and processes measurement data. Likewise, one of ordinary skill in the art would appreciate that other components illustrated in FIGS. 2 and 4 can also be implemented either in hardware or in software.

Figure 5:
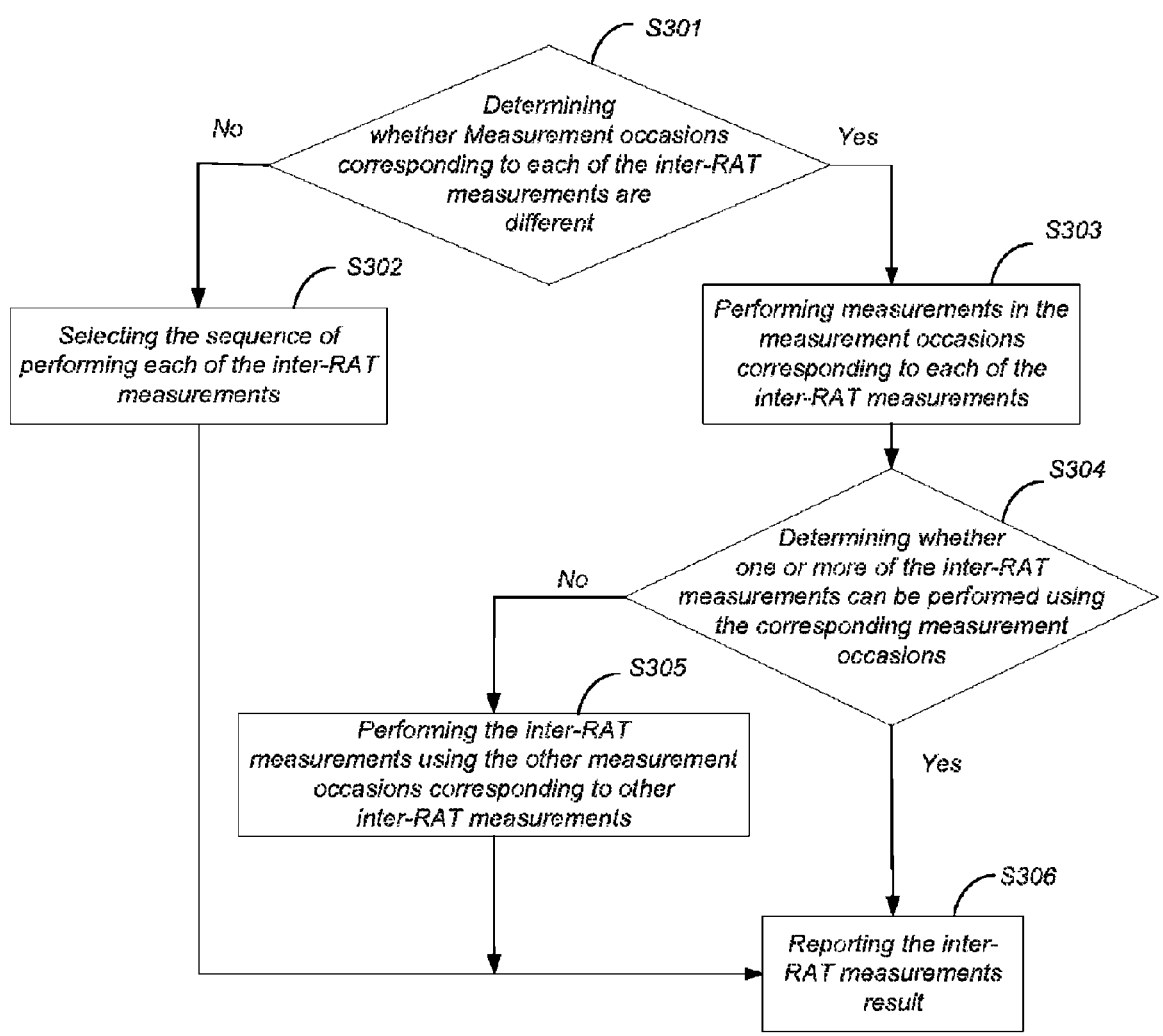
FIG. 5 illustrates another method for performing measurement in a communication terminal, consistent with another exemplary embodiment.

FIG. 5 illustrates another method 500 for performing measurement in a communication terminal, consistent with another exemplary embodiment. In method 500, measuring of the measurement quantities is an inter-Radio Access Technology (inter-RAT) type measuring. Referring to FIG. 5, in step S301, the communication terminal determines whether measurement occasions corresponding to each of the inter-RAT measurements are different. If they are not different, in step S302, the communication terminal may select the sequence of performing each of the inter-RAT measurements. As an example, the network may configure a same measurement occasion x for measuring of measurement quantities A, B, and C. The measurement occasion x may include, for example, idle intervals corresponding to a frame in every other y frames, or time slots in a frame in every other z frames. Measurement quantities A, B, and C may correspond to measurement identities 1, 2, and 3, respectively. And the network configuration may be such that measurement identities 1, 2, and 3 correspond to measuring of different systems such as GSM, TD-SCDMA, and LTE, respectively.

Under this circumstance, the communication terminal may not perform the measurements according to the network configuration and may instead select the sequence of measuring of the measurement quantities A, B, and C. That is, in step S302, the communication terminal may select the sequence of performing the measurements based on various factors. Considering the above example, the network's original configuration may indicate that the measurement is to be performed in the order of A, B, and C. If, however, the communication terminal determines that the measuring of measurement quantity A cannot be currently performed, the communication terminal then adjusts the measurement sequence to be in the order of B, C, and A. Furthermore, if the collection of the required measurement occasions to measure measurement quantities B and C is less than or equal to the measurement occasion x, then measurement quantities B and C can be measured in a single measurement occasion x of a measurement period. One of ordinary skill in the art would appreciate that the communication terminal may choose any other arrangement of the measurement sequence.

If the communication terminal determines the measurement occasions corresponding to each of the inter-RAT measurements are different, in step S303, the communication terminal performs measurements in the measurement occasions corresponding to each of the inter-RAT measurements, according to the network configuration. However, the communication terminal may or may not be able to perform each of the inter-RAT measurements within the corresponding measurement occasions. Thus, in step S304, the communication terminal determines whether one or more of the inter-RAT measurements can be performed using the corresponding measurement occasions. As an example, if the network configures 10 GSM cells and the communication terminal can only complete measurements of 8 GSM cells within the measurement occasions configured by the network, then the measurement occasions are determined to be insufficient and thus the measurement cannot be performed. Other exemplary circumstances where the measurements cannot be performed because of insufficient or improper measurement occasions are described above corresponding to FIGS. 1-4 and therefore will not be repeated here.

If at least one of the inter-RAT measurements cannot be performed, in step S305, the communication terminal performs the inter-RAT measurements using the other measurement occasions corresponding to other inter-RAT measurements. Step S305 can be similar to its counterparts described in methods 100 and 300 corresponding to FIGS. 1 and 3. Therefore, step S305 will not be repeatedly described here. If all of the inter-RAT measurements can be performed, in step S306, the communication terminal reports the inter-RAT measurements result. Step S306 can also be executed after steps S302 and S305.

In method 500, the inter-RAT measurement types can include GSM inter-RAT measurements, WCDMA inter-RAT measurements, TD-SCDMA inter-RAT measurements, and LTE inter-RAT measurements. Method 500 can enable the communication terminal to efficiently utilize the measurement occasions for different inter-RAT systems. Method 500 can also avoid or reduce the possibility that the measurement performance degrades with respect to one or more of the inter-RAT systems. Moreover, method 500 enables the communication terminal to select a more proper inter-RAT system, not just a more convenient system. For example, the communication terminal may be located near a neighboring cell in which the LTE signal strength is better than that of the GSM signal. However, if the measurement occasions for the LTE system are insufficient to complete the corresponding measurements, the communication terminal may select the GSM neighboring cell, instead of the LTE neighboring cell (assuming there is also a lack of coverage of other systems such as a TD-SCDMA system).

Figure 6:
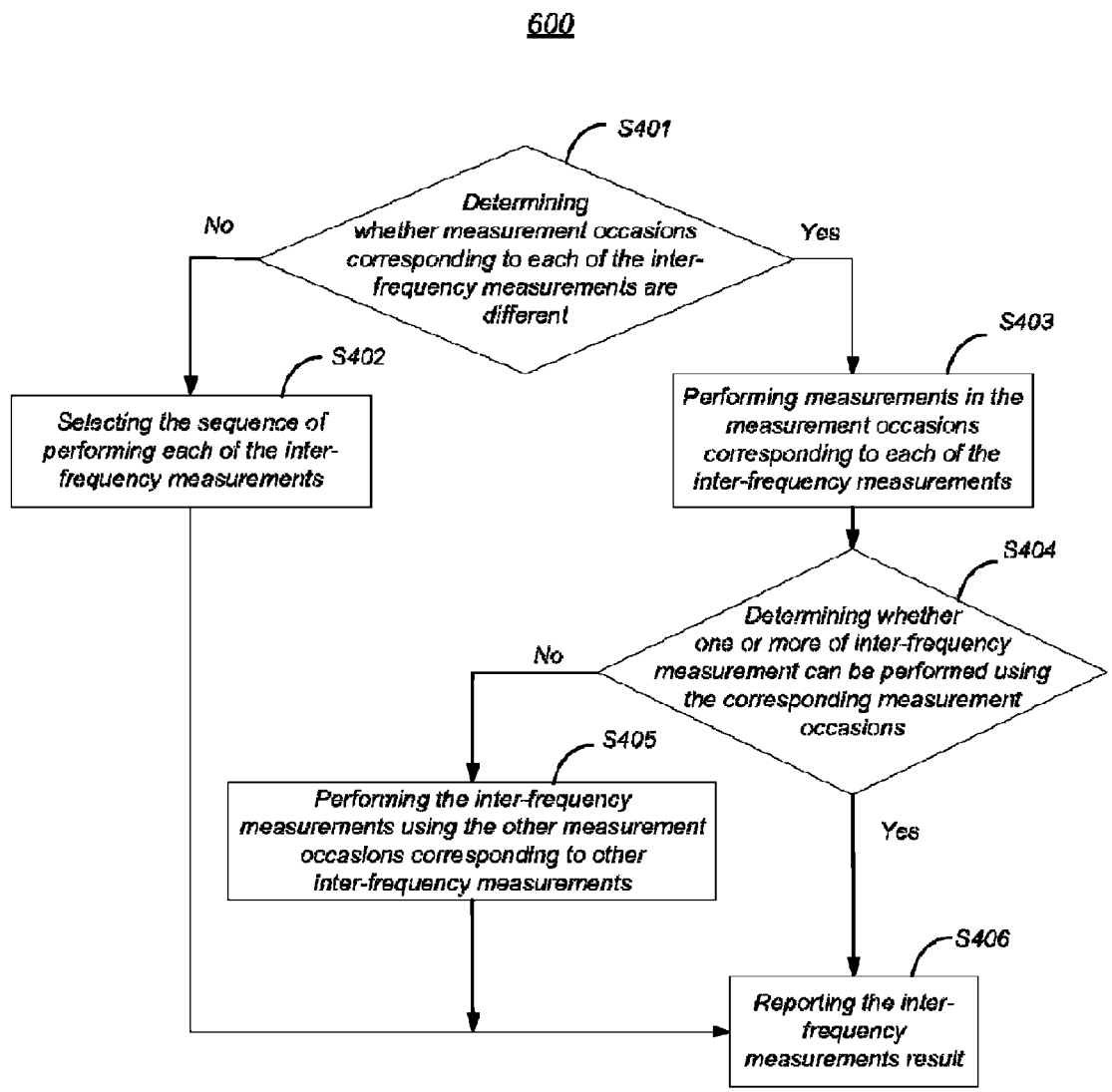
FIG. 6 illustrates another method for performing measurement in a communication terminal, consistent with another exemplary embodiment.

FIG. 6 illustrates another method 600 for performing measurement in a communication terminal, consistent with another exemplary embodiment. In method 600, measuring of the measurement quantities is intra-RAT inter-frequency type measuring. Referring to FIG. 6, in step S401, the communication terminal determines whether measurement occasions corresponding to each of the inter-frequency measurements are different. If they are not different, in step S402, the communication terminal may select the sequence of performing each of the inter-frequency measurements. The details on step S402 can be the same or similar to that of step S302 and thus will not be repeated here.

If the communication terminal determines the measurement occasions corresponding to each of the inter-frequency measurements are different, in step S403, the communication terminal perform measurements in the measurement occasions corresponding to each of the inter-frequency measurements, according to the network configuration. However, the communication terminal may or may not be able to perform each of the inter-frequency measurements within the corresponding measurement occasions. Thus, in step S404, the communication terminal determines whether one or more of the inter-frequency measurement can be performed using the corresponding measurement occasions. If at least one of the inter-frequency measurements cannot be performed, in step S405, the communication terminal performs the inter-frequency measurements using the other measurement occasions corresponding to other inter-frequency measurements.

If all of the inter-frequency measurements can be performed, in step S406, the communication terminal reports the inter-frequency measurements result, Step S406 can also be executed after steps S402 and S405. Steps S403-S406 can be similar to their counterpart described in methods 500 and/or in methods 100 and 300. Therefore, details of these steps will not be repeated here.

In method 600, the intra-RAT inter-frequency measurement types can include GSM system measurements, WCDMA system measurements, TD-SCDMA system measurements, and LTE system measurements. For any of the above systems, the communication terminal can measure the measurement quantities corresponding to different frequencies within the same system. Method 600 for a communication terminal can enable the communication terminal to efficiently utilize the measurement occasions for each of the measurement quantities. Method 600 can also avoid or reduce the possibility that the measurement performance degrades with respect to one or more of the measurement quantities.

Moreover, method 600 enables the communication terminal to select a more proper neighboring cell, not just a more convenient neighboring cell. For example, the communication terminal may be located near a neighboring cell No. 1 in which the signal strength is better than that of a neighboring cell No. 2. However, if the measurement occasions for the neighboring cell No. 1 are insufficient to complete the corresponding measurements, the communication terminal may select the neighboring cell No. 2, instead of the neighboring cell No. 1 (assuming the current cell cannot satisfy the minimum communication requirement).

Figure 7:
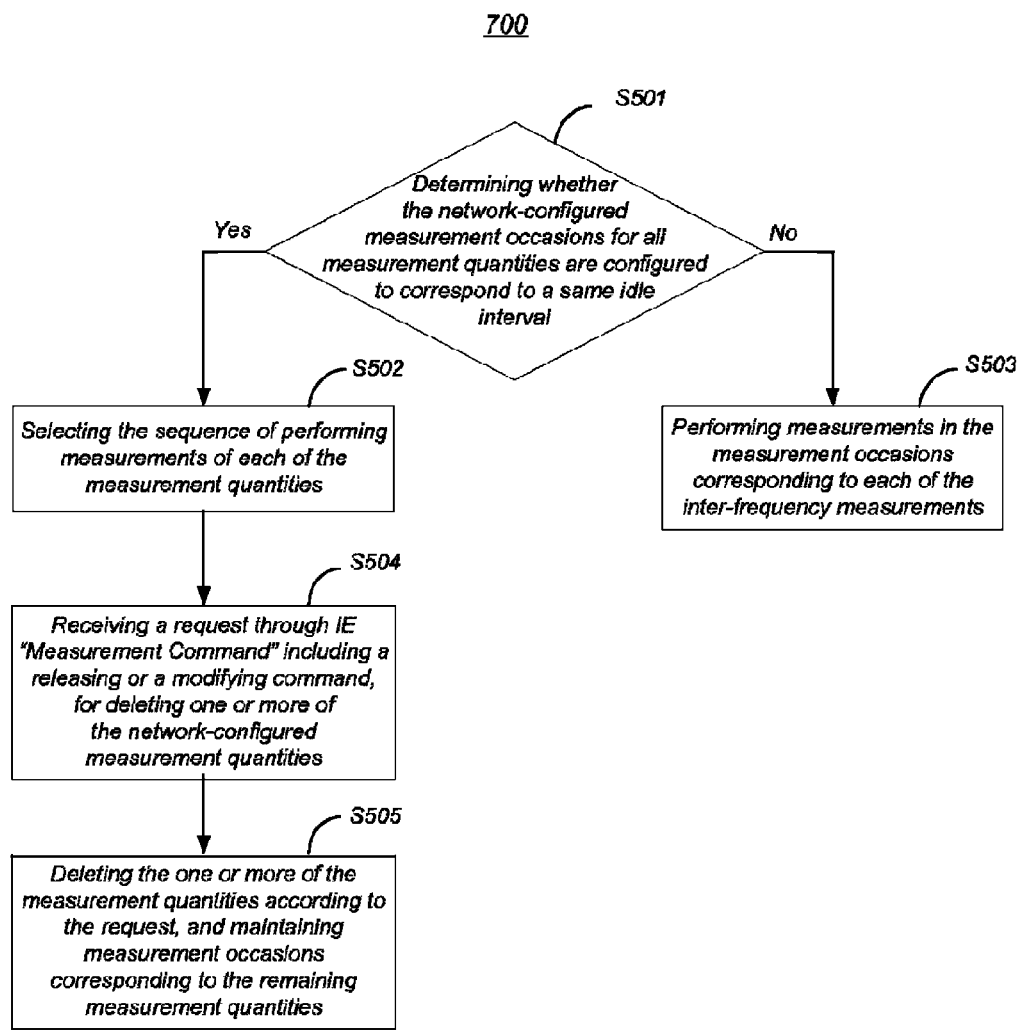
FIG. 7 illustrates another method for performing measurement in a communication terminal, consistent with another exemplary embodiment.

FIG. 7 illustrates another method 700 for performing measurement in a communication terminal, consistent with another exemplary embodiment. Referring to FIG. 7, in step S501, the communication terminal determines whether the measurement occasions for all measurement quantities are configured to correspond to a same idle interval. If the measurement occasions for all measurement quantities are not configured to correspond to the same idle interval, in step S503, the communication terminal perform measurements in the measurement occasions corresponding to each of the inter-frequency measurements, according to the network configuration. The details on step S503 can be the same or similar to that of steps S303 and S403 in FIGS. 5 and 6, respectively, and thus will not be repeated here.

If the measurement occasions for all measurement quantities are configured to correspond to a same idle interval, in step S502, the communication terminal may select the sequence of performing measurements of each of the measurement quantities. As described above corresponding to FIGS. 5 and 6, the network may use the same idle interval to configure all measurement occasions corresponding to all of the measurement quantities. In this situation, all of the measurement quantities are measured in the same measurement occasion. Thus, when measuring of a particular measurement quantity cannot be performed in the measurement occasion, measuring the measurement quantities using one or more other measurement occasions is equivalent to reordering the measurement consequence with respect to the same measurement occasions. The details of step S502 can be the same or similar to that of steps S302 and S402 in FIGS. 5 and 6, respectively, and thus will not be repeated here.

When all of the measurement quantities are configured corresponding to the same measurement occasion, the communication terminal may freely and flexibly arrange or configure the measurements according to the requirements of each measurement quantity. Moreover, the step of statistically combining measurement occasion, e.g., step S201 as shown in FIG. 3, may also be simplified, because the collection of the measurement occasions is now equivalent to the measurement occasion corresponding to any one of the measurement quantities. By selecting the sequence of performing measurements, the measurement occasions corresponding to different measurements may be used more efficiently and adjusting of the collection of measurement occasions can also be more convenient.

Referring to FIG. 7, in step S504, the communication terminal receives a request for deleting one or more of the measurement quantities. The request can be received through IE "Measurement Command" that includes a releasing or a modifying command. As described earlier, IE "Measurement Command" is included in the "Measurement Control" information message. In step S505, when the measurement occasions for all measurement quantities are configured to correspond to the same idle interval, the communication terminal deletes the one or more of the measurement quantities according to the request, and maintains measurement occasions corresponding to the remaining measurement quantities. The remaining measurement quantities are valid measurement quantities.

Similar to those described corresponding to FIG. 3, the steps S504 and S505 are exemplary embodiments of adjusting the collection of the measurement occasions based on one or more changes of the network configuration. As an example, measurement quantities A, B, and C may be all configured corresponding to the same measurement occasion x for performing measurement. If, before the measurement quantities A, B, and C are measured, the communication terminal receives a "Measurement Control" information message from the network requesting that the communication terminal release measurement quantity B, then the communication terminal will delete measurement quantity B in accordance with the network's request. However, the communication terminal will still maintain the measuring of measurement quantities A and C corresponding to measurement occasion x. After deleting a particular measurement quantity, such as measurement quantity B, the communication terminal may also rearrange or reorder the measurements of the remaining measurement quantities corresponding to the same measurement occasion.

In method 700, because all measurement quantities may be configured corresponding to the same measurement occasion, the communication terminal may thus not be required to adjust and/or identify currently-valid measurement identities corresponding to the measurement occasions. Method 700 has the benefit of consistent and efficient utilization of the measurement occasions for each measurement.

One of ordinary skill in the art would also appreciate that the various methods provided in the present disclosure can be implemented in hardware components or combinations of hardware and software such as, for example, ASICs, special purpose computers, or general purpose computers. One of ordinary skill in the art would also appreciate that the various methods provided in the present disclosure can be implemented as computer-readable statements or instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory.

Communication terminals consistent with embodiments of the present disclosure, such as the apparatus illustrated in FIGS. 2 and 4, may be user equipment (UE) or mobile stations, or systems including such. Although not discussed herein, UE or mobile stations may include any one of or a combination of antennas, receivers, transmitters, processors, memories, and/or any other well-known communication components. Systems including UE or mobile stations may also include base stations, Node Bs, eNode Bs, relay stations, and/or access points. Communication terminals consistent with embodiments of the present disclosure may operate in GSM, TDMA, TD-SCDMA, WCDMA, TDD LTE, FDD LTE, WiMAX, WiFi, and/or any other 2G, 3G, and 4G communication modes.

Furthermore, one of ordinary skill in the art would appreciate that the illustrated procedures and apparatus components can be modified without deviating from the spirit of the invention. For example, in the processes described above, additional steps may be introduced or certain steps may be removed. In the apparatus illustrated in FIGS. 2 and 4, several individual components may be combined into one, such as an integrated circuit chip, or features or functions of a certain component may be divided across multiple hardware or software components.

Other embodiments of the subject matter will be apparent to those skilled in the art from consideration of the specification and practice of the subject matter disclosed herein. The scope of the disclosed subject matter is intended to cover any variations, uses, or adaptations of the subject matter following the general principles thereof and including such departures from the present disclosure as come within known or customary practice in the art. It is intended that the specification and examples be considered as exemplary only, with a true scope and spirit of the subject matter being indicated by the following claims.

It will be appreciated that the present disclosure is not limited to the exact construction that has been described above and illustrated in the accompanying drawings, and that various modifications and changes can be made without departing from the scope thereof. It is intended that the scope of the subject matter only be limited by the appended claims.

What is claimed is:

1. A method in a communication terminal for measuring one or more measurement quantities, wherein the measurement quantities correspond to a measurement identity, the method comprising:
   determining whether measurement of the measurement quantities can be performed in a first measurement occasion corresponding to the measurement identity by measuring of a plurality of measurement quantities of the first measurement occasion and a plurality of measurement quantities of a second measurement occasion with a combined measurement occasions of the first measurement occasion and the second measurement occasion; and
   if measurement of the measurement quantities cannot be performed in the first measurement occasion, measuring the measurement quantities using one or more other measurement occasions, wherein the one or more of the other measurement occasions correspond to at least one other measurement identity, wherein
      measuring the measurement quantities comprises at least one of an inter-Radio Access Technology (inter-RAT) type measuring, an intra-RAT inter-frequency type measuring, and an intra-frequency type measuring, and
      the second measurement occasion is not in a consecutive frames from the first measurement occasion.

2. The method of claim 1, wherein measuring the measurement quantities using one or more of the other measurement occasions comprises measuring the measurement quantities using both the first measurement occasion and one or more of the other measurement occasions.

3. The method of claim 1, wherein the one or more of the other measurement occasions are greater than required measurement occasions for measuring of the corresponding other measurement quantities, the other measurement quantities correspond to the at least one other measurement identity.

4. The method of claim 1, wherein the one or more of the other measurement occasions are unused portions of measurement occasions for measuring measurement quantities corresponding to the at least one other measurement identity.

5. The method of claim 1, wherein the determining determines that measuring the measurement quantities cannot be performed in the first measurement occasion, when the first measurement occasion is less than a required measurement occasion for measuring of the measurement quantities.

6. The method of claim 1, wherein the measuring the measurement quantities using one or more of the other measurement occasions comprises:
   re-allocating measurement occasions to measurement quantities corresponding to each measurement identity, wherein the measurement occasions include at least one of the first measurement occasion and the other measurement occasions; and
   measuring the measurement quantities based on the re-allocated measurement occasions.

7. The method of claim 6, wherein re-allocating the measurement occasions is based on an amount of measurement occasions required by measuring of the measurement quantities corresponding to each measurement identity.

8. The method of claim 6, wherein re-allocating the measurement occasions is based on a priority of the measurement quantities corresponding to each measurement identity.

9. The method of claim 6, wherein re-allocating the measurement occasions comprises:
   identifying a collection of all available measurement occasions;
   identifying a collection of all measurement quantities to be measured; and
   re-allocating the measurement occasions based on the collection of all available measurement occasions and the collection of all measurement quantities to be measured.

10. The method of claim 9, wherein re-allocating the measurement occasions further comprises adjusting the collection of all available measurement occasions based on one or more changes in network configuration.

11. The method of claim 10, wherein identifying a collection of all available measurement occasions comprises:
    identifying measurement identities corresponding to each of the measurement occasions indicated in at least one of an Information Element (IE) "CELL_DCH Measurement Occasion Info LCR" and an IE "Idle Interval Information;" and
    identifying status indicators of the measurement identities corresponding to each of the measurement occasions indicated in the IE "CELL DCH Measurement Occasion Info LCR."

12. The method of claim 10, wherein the adjusting the sum of all available measurement occasions comprises:
    when the network configuration releases one or more of the measurement identities or modifies the measurement occasions corresponding to one or more of the measurement identities, inspecting the corresponding idle interval configured in an IE "Idle Interval Information;"
    deleting the released measurement identities corresponding to the idle interval;

determining whether all measurement identities corresponding to the idle interval are deleted; and when all of the measurement identities corresponding to the idle interval are deleted, and when measurement occasions configured in an Information Element (IE) "CELL_DCH Measurement Occasion Info LCR" are activated, deleting, from the sum of the measurement occasions, measurement occasions that are not included in the activated measurement occasions and not overlapping with other idle intervals configured by other IEs "Idle Interval Information,"

when the measurement occasions configured in the IE "CELL_DCH Measurement Occasion Info LCR" are inactivated, modifying status indicators of the inactivated measurement occasions to be inactivated, deleting the inactivated measurement occasions that are not overlapping with the other idle intervals configured by the other IEs "Idle Interval Information."

13. The method of claim 12, wherein when the network configuration modifies the measurement occasions corresponding to one or more of the measurement identities, the method further comprising:
updating the collection of all available measurement occasions with the modified measurement occasions; and
recording a relationship of the modified measurement occasions and the one or more of the corresponding measurement identities.

14. The method of claim 10, wherein the adjusting the sum of the measurement occasions comprises:
determining whether the measurement occasions for all measurement quantities correspond to the same idle interval;
receiving a request for deleting one or more of the measurement quantities, wherein the request is received through a measurement command for releasing or modifying; and
when the measurement occasions for all measurement quantities correspond to the same idle interval,
deleting the one or more of the measurement quantities according to the request, and
maintaining measurement occasions corresponding to the remaining measurement quantities, wherein the remaining measurement quantities are valid measurement quantities.

15. The method of claim 9, wherein re-allocating the measurement occasions further comprises adjusting the collection of the measurement quantities based on one or more changes in the network configuration.

16. The method of claim 1, wherein measuring of the one or more measurement quantities is an inter-Radio Access Technology (inter-RAT) type measuring and wherein measuring of the measurement quantities using one or more of the other measurement occasions comprises:
determining whether measurement occasions corresponding to each of the inter-RAT measurements are different;
if the measurement occasions corresponding to each of the inter-RAT measurements are different, determining whether one or more of the inter-RAT measurements can be performed using the corresponding measurement occasions; and
if at least one of the inter-RAT measurements cannot be performed, performing the inter-RAT measurements using the other measurement occasions corresponding to other inter-RAT measurements.

17. The method of claim 1, wherein measuring of the one or more measurement quantities is an intra-RAT inter-frequency type measuring and wherein measuring of the measurement quantities using one or more of the other measurement occasions comprises:
determining whether measurement occasions corresponding to each of the inter-frequency measurements are different;
if the measurement occasions corresponding to each of the inter-frequency measurements are different, determining whether one or more of the inter-frequency measurement can be performed using the corresponding measurement occasions; and
if at least one of the inter-frequency measurements cannot be performed, performing the inter-frequency measurements using the other measurement occasions corresponding to other inter-frequency measurements.

18. A communication terminal for measuring one or more measurement quantities, wherein the measurement quantities correspond to a measurement identity, comprising:
a first determination unit that determines whether measurement of the measurement quantities can be performed in a first measurement occasion corresponding to the measurement identity; and
an execution unit that measures the measurement quantities using one or more other measurement occasions when the first determination unit determines measurement of the measurement quantities cannot be performed in the first measurement occasion, wherein one or more of the other measurement occasions correspond to at least one other measurement identity by measuring of a plurality of measurement quantities of the first measurement occasion and a plurality of measurement quantities of a second measurement occasion with a combined measurement occasions of the first measurement occasion and the second measurement occasion, wherein
the execution unit performs at least one of an inter-Radio Access Technology (inter-RAT) type measuring, an intra-RAT inter-frequency type measuring, and an intra-frequency type measuring, and
the second measurement occasion is not in a consecutive frames from the first measurement occasion.

19. The communication terminal of claim 18, wherein when the first determination unit determines measuring of the measurement quantities cannot be performed in the first measurement occasion, the execution unit measures the measurement quantities using both the first measurement occasion and one or more of the other measurement occasions.

20. The communication terminal of claim 18, wherein the one or more of the other measurement occasions are greater than required measurement occasions for measuring of the corresponding other measurement quantities, the other measurement quantities correspond to the at least one other measurement identity.

21. The communication terminal of claim 18, wherein the one or more of the other measurement occasions are unused portions of measurement occasions for measuring measurement quantities corresponding to the at least one other measurement identity.

22. The communication terminal of claim 18, wherein the first determination unit that measuring the measurement quantities cannot be performed in the first measurement occasion, the first measurement occasion is less than a required measurement occasion for measuring of the measurement quantities.

23. The communication terminal of claim 18, further comprises an allocator that re-allocates measurement occasions to measurement quantities corresponding to each measurement identity, wherein the measurement occasions include at least one of the first measurement occasion and the other measurement occasions; and wherein the execution unit measures the measurement quantities based on the re-allocated measurement occasions.

24. The communication terminal of claim 23, wherein the allocator re-allocates the measurement occasions based on an amount of measurement occasions required by measuring of the measurement quantities corresponding to each measurement identity.

25. The communication terminal of claim 23, wherein the allocator re-allocates the measurement occasions based on a priority of the measurement quantities corresponding to each measurement identity.

26. The communication terminal of claim 23, further comprises:
a measurement occasion mixer that identifies a collection of all available measurement occasions;
a measurement quantity mixer that identifies a collection of all measurement quantities to be measured; and
wherein the allocator re-allocates the measurement occasions based on the collected of all available measurement occasions and the sum of all measurement quantities to be measured.

27. The communication terminal of claim 26, further comprises an adjuster that adjusts the collection of all available measurement occasions based on one or more changes in network configuration.

28. The communication terminal of claim 27, wherein the measurement occasion mixer comprises a statistical combiner that:
identifies measurement identities corresponding to each of the measurement occasions indicated in at least one of an Information Element (IE) "CELL_DCH Measurement Occasion Info LCR" and an IE "Idle Interval Information;" and
identifies status indicators of the measurement identities corresponding to each of the measurement occasions indicated in the IE "CELL_DCH Measurement Occasion Info LCR."

29. The communication terminal of claim 27, wherein the adjuster that adjusts the collection of all available measurement occasions by:
inspecting the corresponding idle interval configured in an IE "Idle Interval Information," when the network configuration releases one or more of the measurement identities or modifies the measurement occasions corresponding to one or more of the measurement identities;
deleting the released measurement identities corresponding to the idle interval;
determining whether all measurement identities corresponding to the idle interval are deleted; and
when all of the measurement identities corresponding to the idle interval are deleted, and when measurement occasions configured in an Information Element (IE) "CELL_DCH Measurement Occasion Info LCR" are activated,
deleting, from the sum of the measurement occasions, measurement occasions that are not included in the activated measurement occasions and not overlapping with other idle intervals configured by other IEs "Idle Interval Information,"
when the measurement occasions configured in the IE "CELL_DCH Measurement Occasion Info LCR" are inactivated,
modifying status indicators of the inactivated measurement occasions to be inactivated,
deleting the inactivated measurement occasions that are not overlapping with the other idle intervals configured by the other IEs "Idle Interval Information."

30. The communication terminal of claim 29, wherein when the network configuration modifies the measurement occasions corresponding to one or more of the measurement identities, the adjustor further:
updates the sum of all available measurement occasions with the modified measurement occasions; and
records a relationship of the modified measurement occasions and the one or more of the corresponding measurement identities.

31. The communication terminal of claim 29, further comprises:
a second determination unit that determines whether the measurement occasions for all measurement quantities correspond to the idle interval;
a receiver that receives a request for deleting one or more of the measurement quantities, wherein the request is received through a measurement command for releasing or modifying; and
when the measurement occasions for all measurement quantities correspond to the same idle interval, the adjuster
deletes the one or more of the measurement quantities according to the request, and
maintains measurement occasions corresponding to the remaining measurement quantities, wherein the remaining measurement quantities are valid measurement quantities.

32. The communication terminal of claim 26, further comprises an adjuster that adjusts the collection of the measurement quantities based on one or more changes in the network configuration.

33. The communication terminal of claim 18, wherein measuring of the one or more measurement quantities is an inter-Radio Access Technology (inter-RAT) type measuring and further comprises:
a third determination unit that determines whether measurement occasions corresponding to each of the inter-RAT measurements are different;
a fourth determination unit that determines whether one or more of the inter-RAT measurements can be performed using the corresponding measurement occasions, if the third determination unit determines that the measurement occasions corresponding to each of the inter- RAT measurements are different; and
if the fourth determination unit determines that one or more of the inter-RAT measurements cannot be performed, the execution unit performs the inter-RAT measurements using the other measurement occasions corresponding to other inter-RAT measurements.

34. The communication terminal of claim 18, wherein measuring of the one or more measurement quantities is an intra-RAT inter-frequency type measuring and further comprises:
a fifth determination unit that determines whether measurement occasions corresponding to each of the inter-frequency measurements are different;
a sixth determination unit that determines whether one or more of the inter-frequency measurement can be performed using the corresponding measurement occasions, if the fifth determination unit determines that the measurement occasions corresponding to each of the inter-frequency measurements are different; and if the sixth determination unit determines that at least one of the inter-frequency measurements cannot be performed, the execution unit performs the inter-frequency measurements using the other measurement occasions corresponding to other inter-frequency measurements.

* * * * *

UNITED STATES PATENT AND TRADEMARK OFFICE
CERTIFICATE OF CORRECTION

PATENT NO.         : 9,014,044 B2                                    Page 1 of 1
APPLICATION NO.    : 14/004422
DATED              : April 21, 2015
INVENTOR(S)        : Cai Li et al.

It is certified that error appears in the above-identified patent and that said Letters Patent is hereby corrected as shown below:

On the Title Page

On page 1, item (30), Foreign Application Priority Data, insert:

-- Feb. 14, 2012 (CN) ........................ 2012 1 0032814 --.

Signed and Sealed this
Fourth Day of August, 2015

Michelle K. Lee
*Director of the United States Patent and Trademark Office*